US007747294B2

(12) United States Patent

Kwon

(10) Patent No.: US 7,747,294 B2

(45) Date of Patent: Jun. 29, 2010

(54) MOBILE STATION WITH SATELLITE ANTENNA

(75) Inventor: Jong-Hun Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 920 days.

(21) Appl. No.: 11/336,287

(22) Filed: Jan. 19, 2006

(65) Prior Publication Data

US 2006/0170656 A1 Aug. 3, 2006

(30) Foreign Application Priority Data

Jan. 29, 2005 (KR) ..................... 10-2005-0008373

(51) Int. Cl.
*H04M 1/00* (2006.01)

(52) U.S. Cl. ............. 455/575.1; 455/550.1; 455/575.7; 455/575.8

(58) Field of Classification Search ... 455/575.1–575.7, 455/128–129, 90.3, 550.1; 345/156, 168–169
See application file for complete search history.

(56) References Cited

U.S. PATENT DOCUMENTS

| | | | | |
|---|---|---|---|---|
| 5,924,044 | A * | 7/1999 | Vannatta et al. | 455/556.1 |
| 6,043,781 | A * | 3/2000 | Toh et al. | 343/702 |
| 6,054,960 | A * | 4/2000 | Tolson et al. | 343/702 |
| 6,097,934 | A * | 8/2000 | Spall et al. | 455/575.7 |
| 6,239,754 | B1 * | 5/2001 | Kim | 343/702 |
| 6,411,826 | B1 * | 6/2002 | Camp, Jr. | 455/566 |
| 6,542,716 | B1 * | 4/2003 | Dent et al. | 455/13.1 |
| 6,662,021 | B2 * | 12/2003 | Kang et al. | 455/553.1 |
| 6,859,179 | B2 * | 2/2005 | Chang | 343/702 |
| 6,876,875 | B2 * | 4/2005 | Shimazaki et al. | 455/575.1 |
| 6,950,680 | B2 * | 9/2005 | Kela et al. | 455/566 |
| 6,975,874 | B1 * | 12/2005 | Bates et al. | 455/456.6 |
| 7,003,330 | B2 * | 2/2006 | Moles | 455/572 |
| 7,017,256 | B2 * | 3/2006 | Joly et al. | 29/600 |
| 2004/0263482 | A1 * | 12/2004 | Goertz | 345/173 |

FOREIGN PATENT DOCUMENTS

| | | |
|---|---|---|
| CN | 1333934 A | 1/2002 |
| CN | 1354534 A | 6/2002 |

* cited by examiner

*Primary Examiner*—CongVan Tran
(74) *Attorney, Agent, or Firm*—Lee, Hong, Degerman, Kang & Waimey

(57) ABSTRACT

A mobile station comprises a substrate having circuitry adapted to perform communication functions. The mobile station also comprises a keypad adapted to receive input from a user to control the mobile station, wherein at least one key of the keypad is operably coupled to the substrate. The mobile station also comprises an antenna at least partially housed in the at least one key to receive wireless communications. The wireless communications may comprise satellite communications, such as digital multimedia communications. The keypad may comprise input keys adapted to receive input of numbers and characters, and the a multi-key having a plurality of radially arranged buttons. The keypad may also comprise function keys arranged around the multi-key, and a padbase adapted to fix the input keys, the multi-key, and the function keys on the surface of the keypad. The antenna may be positioned in a lower portion of the multi-key.

14 Claims, 4 Drawing Sheets

MOBILE STATION WITH SATELLITE ANTENNA

CROSS-REFERENCE TO RELATED APPLICATIONS

Pursuant to 35 U.S.C. §119(a), this application claims the benefit of earlier filing date and right of priority to Korean Application No. 2005-0008373, filed on Jan. 29, 2005, the contents of which are hereby incorporated by reference herein in their entirety.

FIELD OF THE INVENTION

The present invention relates generally to a mobile station and, more particularly, to a mobile station having a satellite antenna.

BACKGROUND OF THE INVENTION

Mobile stations enable wireless communications between parties. A mobile station may include a satellite antenna to provide digital multimedia services via digital multimedia broadcasting (DMB).

FIG. 1 is a diagram illustrating a disassembled perspective view of a mobile station 100 having a satellite antenna, according to a related art.

Referring to FIG. 1, the mobile station with a satellite antenna includes a body 10 having a connector 17 embedded in one side thereof, and a satellite antenna 30 removably coupled to the connector 17. The body 10 includes a first body portion 11 having a printing circuit substrate mounted therein, and a second body portion 21 slidably coupled to the first body portion 11. The first body portion 11 has a plurality of keys on a front surface thereof to enable users to input data. The first body portion 11 also has a battery 15 removably coupled to a rear surface thereof to supply power. An antenna 13 is coupled to one side of an upper surface of the first body portion 11. Functions of the antenna 13 differ according to communication system type, e.g. cellular system or PCS system. The connector 17 is formed at the other side of the upper surface to allow the satellite antenna 30 to be removably coupled thereto. The second body portion 21 has a display 23 on the front surface thereof for outputting visual information. Keys 25 for inputting data are arranged at one side of the display 23. The satellite antenna 30 includes an (outer) housing 32, a helical antenna installed in the housing 32, and an antenna cable 33 that protrudes downward to the housing 32.

Because the size of the satellite antenna 30 is greater than that of the (cellular/PCS) antenna 13, the satellite antenna 30 is separated from the first body portion 11 when not in use, as shown in FIG. 1. The satellite antenna 30 is used after inserting the antenna cable 33 into the connector 17 for coupling therewith.

Thus, the conventional mobile station with satellite antenna has several problems. As discussed above, using the satellite antenna requires that it be coupled to the connector by inserting the antenna cable thereinto. Furthermore, because the satellite antenna has greater size and is more protruded than the cellular/PCS antenna, the satellite antenna is normally separated from the mobile station when not in use, which may lead to the misplacement of the satellite antenna.

SUMMARY OF THE INVENTION

Accordingly, the present invention is directed to a mobile station having a satellite antenna that substantially obviates one or more problems due to limitations and disadvantages of the related art.

An object of the present invention is to provide a mobile station having an embedded satellite antenna to increase portability and convenience to the user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a mobile station comprises a substrate having circuitry adapted to perform communication functions. The mobile station also comprises a keypad adapted to receive input from a user to control the mobile station, wherein at least one key of the keypad is operably coupled to the substrate. The mobile station also comprises an antenna at least partially housed in the at least one key to receive wireless communications.

The mobile station may further comprise a display adapted to output visual information to the user. The antenna may be further adapted to transmit wireless communications. The wireless communications may comprise satellite communications. The satellite communications may comprise digital multimedia communications.

The keypad may comprise input keys adapted to receive input of numbers and characters, and a multi-key having a plurality of radially arranged buttons. The keypad may also comprise function keys arranged around the multi-key, and a padbase adapted to fix the input keys, the multi-key, and the function keys on the surface of the keypad. The antenna may be positioned in a lower portion of the multi-key. A shape of the antenna may correspond to a shape of the multi-key. The antenna may have a circular, annular shape, and a connection terminal may be formed at one side of the antenna to connect to the substrate. The outside of the antenna may be coated with a synthetic resin.

The mobile station may further comprise a switch, adapted to transfer data received through user input to the circuitry of the substrate, wherein the connection terminal is positioned on the substrate to connect to a position away from the switch. The connection terminal may be constructed of a material having elastic strength. The multi-key may include an antenna accommodation unit, and wherein a height of the antenna accommodation unit is greater than a thickness of the antenna. One of the antenna and the antenna accommodation unit may have a fixing protrusion that protrudes toward the other of the antenna and the antenna accommodation unit, and the other of the antenna and the antenna accommodation unit may have a protrusion accommodation unit adapted to accommodate the fixing protrusion. The mobile station may be one of a folder type, a slide type, a flip type, or a separated display type mobile station. The antenna may be concealed from view by the keypad.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The term 'mobile station' encompasses mobile phones, handsets, PDAs (personal digital assistants), and computers, as well as any other devices with wireless communication capabilities. A mobile station having an embedded satellite antenna is described below. Although the present invention refers to a folder type mobile station, other types of mobile stations may be used, such as slide type, flip type, or separated display type mobile stations, for example. Furthermore, although a satellite antenna is described herein, the techniques and constructions described may also be applied to other types of antennas, such as cellular and/or PCS antennas, for example.

Figure 1:
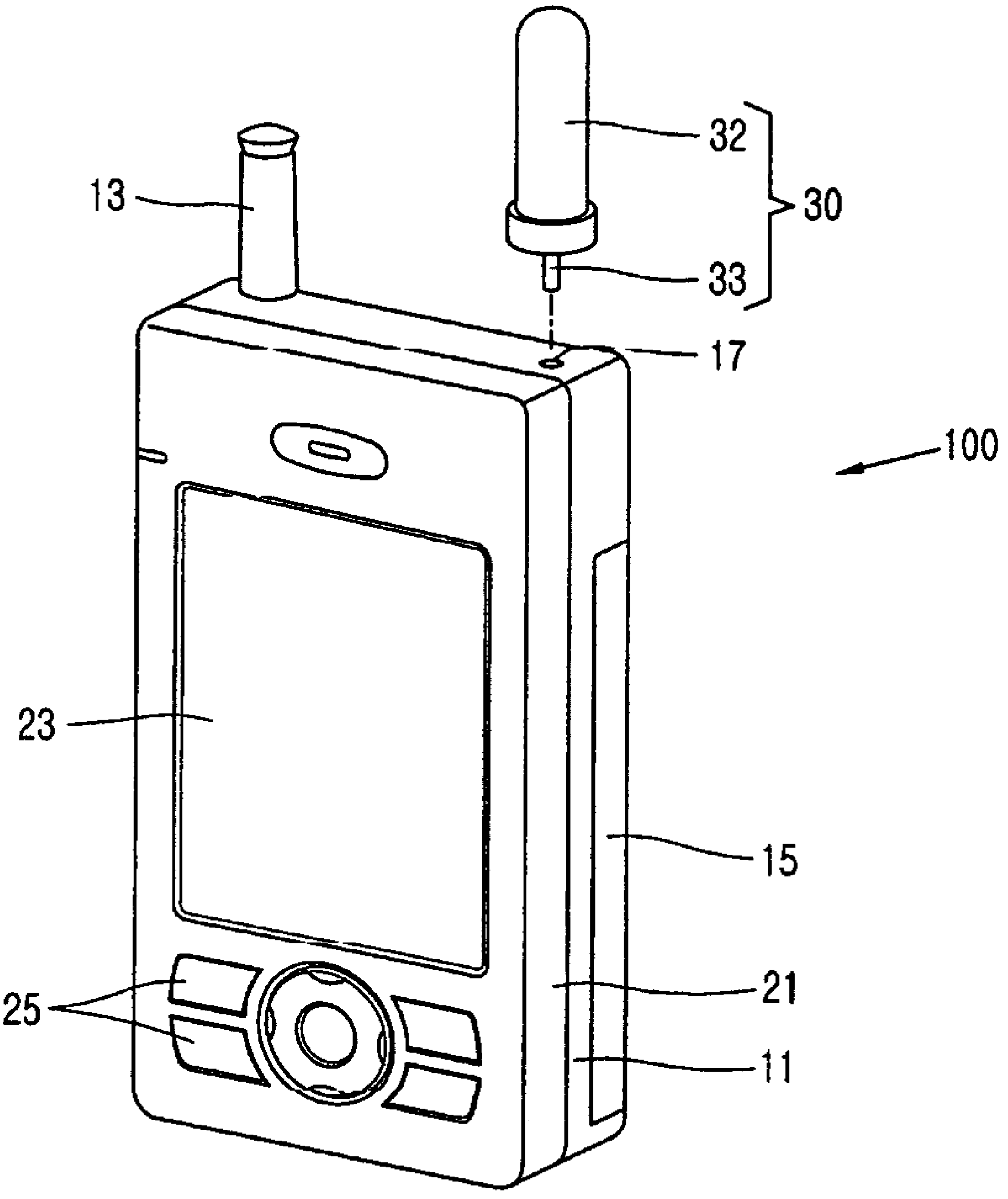
FIG. 1 is a diagram illustrating a disassembled perspective view of a mobile station having a satellite antenna, according to a related art.
Figure 2:
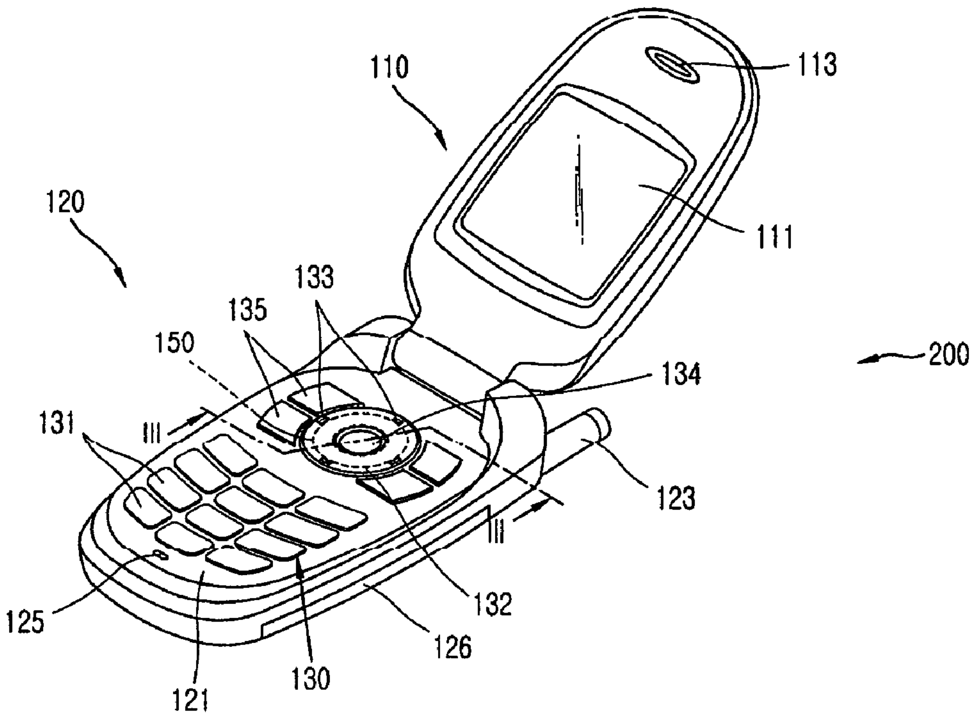
FIG. 2 is a diagram illustrating a perspective view of a mobile station, according to an embodiment of the present invention.

FIG. 2 is a diagram illustrating a perspective view of a mobile station 200, according to an embodiment of the present invention.

Referring to FIG. 2, the mobile station 200 includes a first body portion 110 that has a display 111 for outputting visual information. The mobile station also includes a second body portion 120 rotatively coupled to the first body portion 110, a substrate installed in the second body portion 120, and a keypad 130 provided on the substrate. A satellite antenna 150 is interposed between the substrate and the keypad 130 of the mobile station 200.

The first body portion 110 includes a speaker 113 at one side thereof to enable an output of audio information. The first body portion 110 also includes the display 111. The second body portion 120 forms an outer perimeter of the mobile station, and accommodates the substrate by having an accommodation space therein. The second body portion 120 also includes a case 121 having through holes in appropriate positions for exposing the keypad 130 to the exterior.

An antenna 123 is formed at an upper side of the second body portion 120 to be extended in a lengthwise direction such that a radio wave may be transmitted and/or received according to a communication system, such as a PCS system or a cellular system. A microphone 125 for inputting audio information is provided at one side of the front surface of the second body portion 120. A battery 126 for supplying power to the mobile station 200 is removably coupled to a rear surface of the second body portion 120.

The keypad 130 includes a plurality of input keys 131 usable for inputting numbers and characters, a multi-key 132 having a plurality of radially arranged buttons 133, and several function keys 135 arranged around the multi-key 132. A padbase 137 (See FIGS. 3 and 5, below) integrally forms the input keys 131, the multi-key 132, and the function keys 135 on the surface of the keypad 130. Metal plating or other finishing, for example, may be applied to the outer surfaces of the input keys 131, the multi-key 132, and the function keys 135 for aesthetic purposes.

The plurality of input keys 131 may be relatively small is size to enable input of numbers and/or characters by their depression. The discoid or rhombic multi-key 132 may be a navigation key. A through hole is formed in the center of the multi-key and a center key 134 is mounted therein, such that the center key 134 may be depressed independently from the multi-key 132. The multi-key 132 have a square shape or an elliptical shape, for example. The satellite antenna 150 may be embedded in a lower portion of the multi-key 132, for example, as described further below with reference to FIGS. 2-4.

Figure 3:
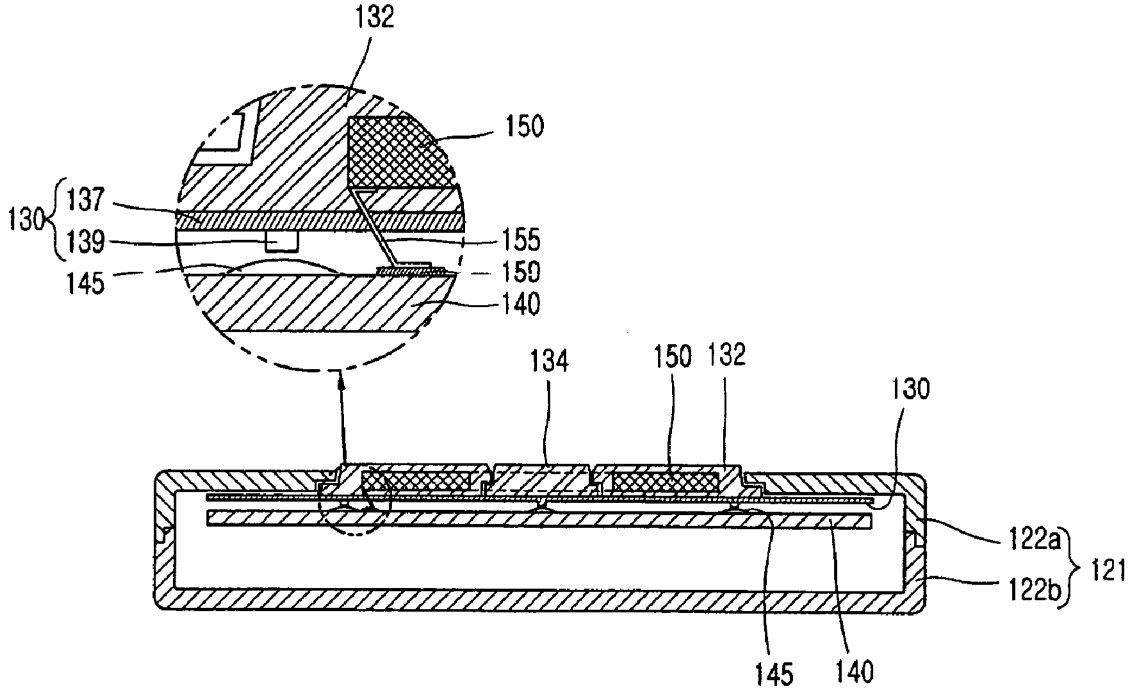
FIG. 3 is a diagram illustration a sectional view taken along line III-III of FIG. 2.
Figure 4:
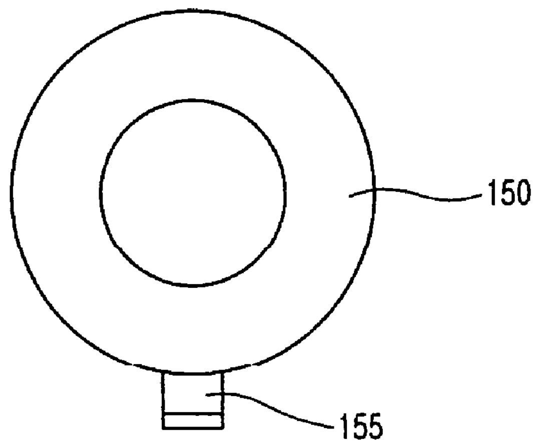
FIG. 4 is a diagram illustrating a plane view of the satellite antenna shown in FIG. 3.

FIG. 3 is a diagram illustrating a sectional view taken along line III-III of FIG. 2. FIG. 4 is a diagram illustrating a plane view of the satellite antenna shown in FIG. 3.

Referring to FIGS. 2-4, the embedded satellite antenna 150 is a loop-type antenna, having a circular and/or annular shape, and is positioned within the multi-key 132. The satellite antenna 150 is formed to correspond to the shape of the multi-key 132. That is, when the multi-key 132 has a square shape, the satellite antenna preferably has a corresponding square same shape. Alternatively, when the multi-key 132 has an elliptical shape, the satellite antenna 150 preferably has a corresponding elliptical shape.

Referring to FIG. 3, the input keys 131, the multi-key 132 and the function keys 135 formed on the keypad 130 are integrally formed on the surface of the padbase 137. The padbase 137 is positioned on the substrate 140 on which circuit components required for communications are mounted. The padbase 137 may have a size corresponding to the length and width of the substrate 140. The padbase 137 is preferably formed of flexible materials such as rubber or plastic, for example.

A protrusion 139 is formed at a lower side of the padbase 137 to correspond to each button position on the keypad 130. A switch 145 is formed at a position that corresponds to the protrusion 139 on the substrate 140, to transfer pressing of each button to the circuit components mounted in the substrate 140.

The satellite antenna 150 is formed in a doughnut shape, for example, and a connection terminal 155 is formed at one side of the satellite antenna 150 to be connected to an antenna connection unit 159 formed on the substrate 140. The connection terminal 155 is preferably connected to the substrate 140 at a position away from where the switch 145 is formed. In addition, since the connection terminal 155 receives elastic force when a user presses the multi-key 132, the connection terminal 155 of the satellite antenna 150 and the antenna connection unit 159 positioned on the substrate 140 are preferably prevented from being disconnected from the substrate 140, by a mechanical member for example. The outside of the satellite antenna 150 is preferably coated using a synthetic resin, for example, for protection from impact. Furthermore, with reference to FIG. 3, reference symbols 122*a* and 122*b* refer to a front case and a rear case, respectively.

Since the satellite antenna is interposed between the substrate and the keypad, and more particularly, mounted in the lower portion of the multi-key, the mobile station may be conveniently used and carried with the satellite antenna. Furthermore, since the satellite antenna does not need to be removed when not in use, the satellite antenna is not subject to being misplaced.

Figure 5:
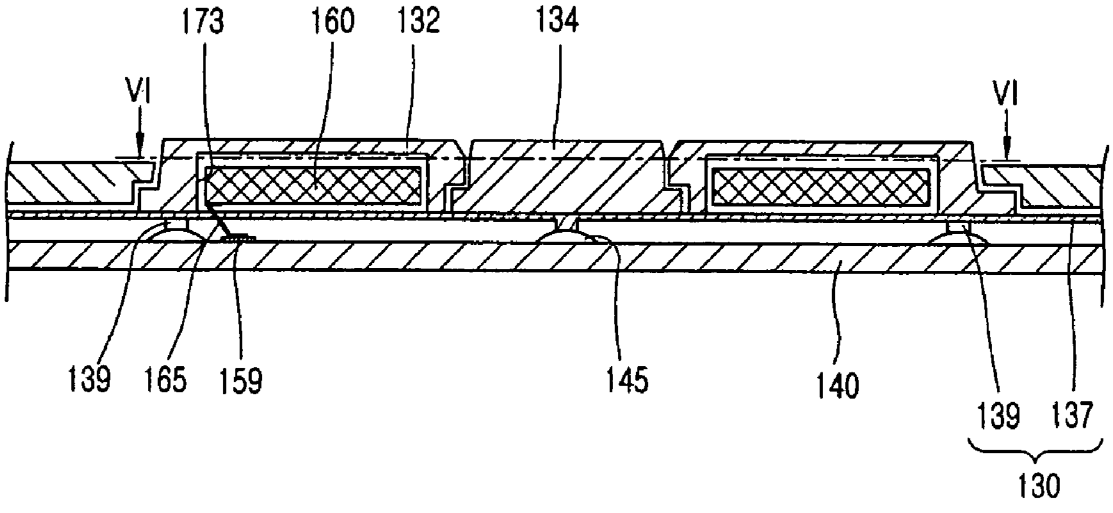
FIG. 5 is a diagram illustrating a sectional view of a portion of a multi-key, according to an embodiment of the present invention.
Figure 6:
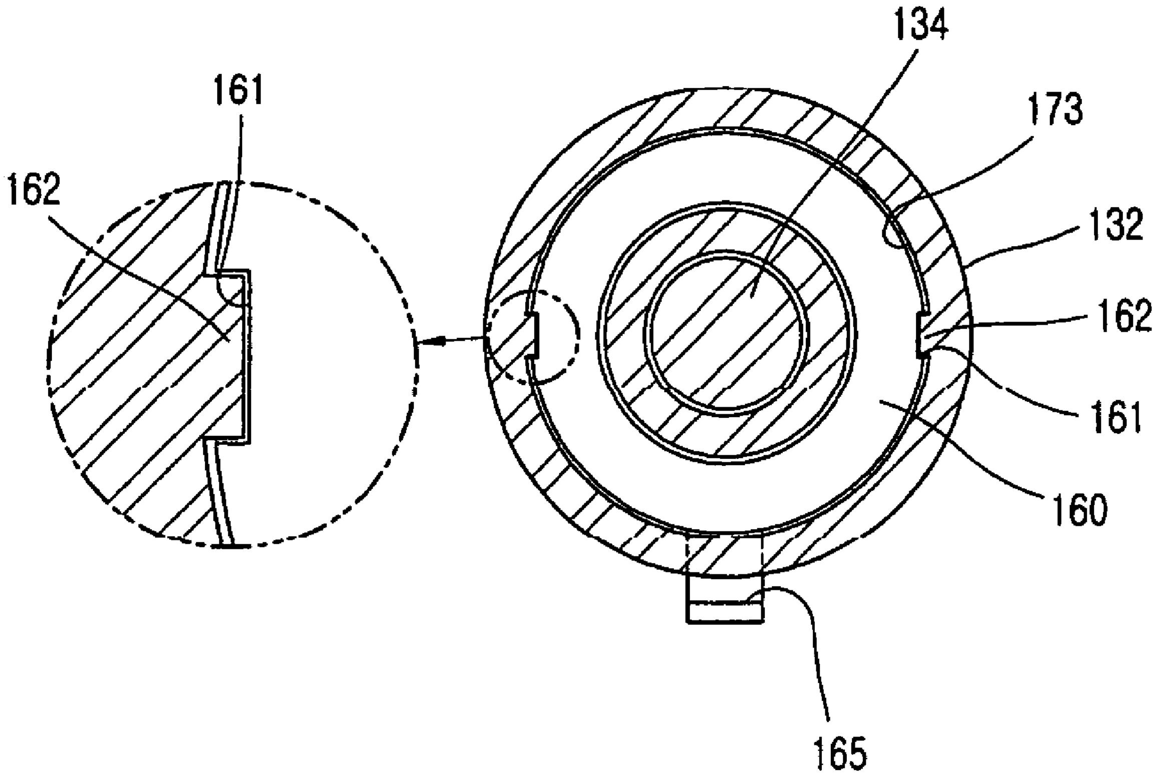
FIG. 6 is a diagram illustrating a sectional view taken along ling VI-VI of FIG. 5.

FIG. 5 is a diagram illustrating a sectional view of a portion of a multi-key, according to an embodiment of the present invention. FIG. 6 is a diagram illustrating a sectional view taken along ling VI-VI of FIG. 5.

Referring to FIGS. 5-6, the multi-key 132 forms an antenna accommodation unit 173 for accommodating a satellite antenna 160, which is aligned to allow upper and lower sides thereof to have certain intervals. In other words, a height of the antenna accommodation unit 173 is preferably greater than a thickness of the satellite antenna 160 to make upper and lower intervals between the satellite antenna 160 and the antenna accommodation unit 173.

To prevent the connection terminal 165 from being separated from the antenna connection unit 159, one of the satellite antenna 160 and the antenna accommodation unit 173 has a fixing protrusion 162 formed therein to protrude toward the other of the satellite antenna 160 and the antenna accommodation unit 173, which also preferably has a protrusion accommodation unit 161 formed therein for accommodating the fixing protrusion 162.

Accordingly, the satellite antenna may maintain a position without interference from the multi-key, even if the multi-key is depressed, thereby reducing the risk of damaging the satellite antenna.

In one embodiment, a mobile station comprises a substrate having circuitry adapted to perform communication functions. The mobile station also comprises a keypad adapted to receive input from a user to control the mobile station, wherein at least one key of the keypad is operably coupled to the substrate. The mobile station also comprises an antenna at least partially housed in the at least one key to receive wireless communications.

The mobile station may further comprise a display adapted to output visual information to the user. The antenna may be further adapted to transmit wireless communications. The wireless communications may comprise satellite communications. The satellite communications may comprise digital multimedia communications.

The keypad may comprise input keys adapted to receive input of numbers and characters, and a multi-key having a plurality of radially arranged buttons. The keypad may also comprise function keys arranged around the multi-key, and a padbase adapted to fix the input keys, the multi-key, and the function keys on the surface of the keypad. The antenna may be positioned in a lower portion of the multi-key. A shape of the antenna may correspond to a shape of the multi-key. The antenna may have a circular, annular shape, and a connection terminal may be formed at one side of the antenna to connect to the substrate. The outside of the antenna may be coated with a synthetic resin.

The mobile station may further comprise a switch, adapted to transfer data received through user input to the circuitry of the substrate, wherein the connection terminal is positioned on the substrate to connect to a position away from the switch. The connection terminal may be constructed of a material having elastic strength. The multi-key may include an antenna accommodation unit, and wherein a height of the antenna accommodation unit is greater than a thickness of the antenna. One of the antenna and the antenna accommodation unit may have a fixing protrusion that protrudes toward the other of the antenna and the antenna accommodation unit, and the other of the antenna and the antenna accommodation unit may have a protrusion accommodation unit adapted to accommodate the fixing protrusion. The mobile station may be one of a folder type, a slide type, a flip type, or a separated display type mobile station. The antenna may be concealed from view by the keypad.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A mobile station, comprising:

a substrate having circuitry adapted to perform communication functions;

a keypad coupled to a body of the mobile station, the keypad being configured to receive input from a user to control the mobile station, wherein at least one key of the keypad is operably coupled to the substrate; and an antenna embedded within the keypad to receive wireless communications, wherein the antenna is at least partially covered with the at least one key, wherein the keypad comprises:

input keys configured to receive an input of numbers or characters, a multi-key comprising a plurality of radially arranged buttons and an antenna accommodation unit configured to accommodate the antenna positioned in a lower portion of the multi-key, function keys arranged around the multi-key, and a padbase configured to fix the input keys, the multi-key, and the function keys on a surface of the keypad.

2. The mobile station of claim 1, further comprising:

a display adapted to output visual information to the user.

3. The mobile station of claim 1, wherein the antenna is further adapted to transmit wireless communications.

4. The mobile station of claim 1, wherein the wireless communications comprise satellite communications.

5. The mobile station of claim 4, wherein the satellite communications comprise digital multimedia communications.

6. The mobile station of claim 1, wherein a shape of the antenna corresponds to a shape of the multi-key.

7. The mobile station of claim 1, wherein the antenna has a circular, annular shape, and a connection terminal is formed at one side of the antenna to connect to the substrate.

8. The mobile station of claim 1, wherein the outside of the antenna is coated with a synthetic resin.

9. The mobile station of claim 7, further comprising:

a switch, adapted to transfer data received through user input to the circuitry of the substrate, wherein the connection terminal is positioned on the substrate to connect to a position away from the switch.

10. The mobile station of claim 7, wherein the connection terminal is constructed of a material having elastic strength.

11. The mobile station of claim 1 wherein a height of the antenna accommodation unit is greater than a thickness of the antenna.

12. The mobile station of claim 11, wherein one of the antenna and the antenna accommodation unit has a fixing protrusion that protrudes toward the other of the antenna and the antenna accommodation unit, and wherein the other of the antenna and the antenna accommodation unit has a protrusion accommodation unit adapted to accommodate the fixing protrusion.

13. The mobile station of claim 1, wherein the mobile station is one of a folder type, a slide type, a flip type, or a separated display type mobile station.

14. The mobile station of claim 1, wherein the antenna is concealed from view by the keypad.

* * * * *